(12) United States Patent
Haddy

(10) Patent No.: US 9,753,173 B1
(45) Date of Patent: Sep. 5, 2017

(54) GENERATION OF BUFFER ZONES FOR BURIED ASSETS USING LINE FORMING PROCESSES

(71) Applicant: Alan Haddy, Naples, FL (US)

(72) Inventor: Alan Haddy, Naples, FL (US)

( * ) Notice: Subject to any disclaimer, the term of this patent is extended or adjusted under 35 U.S.C. 154(b) by 0 days.

(21) Appl. No.: 15/364,249

(22) Filed: Nov. 29, 2016

(51) Int. Cl.
| | |
|---|---|
| *G01V 3/08* | (2006.01) |
| *G01R 31/02* | (2006.01) |
| *G08C 17/02* | (2006.01) |
| *G01V 3/12* | (2006.01) |
| *G01V 3/15* | (2006.01) |
| *G01S 5/02* | (2010.01) |

(52) U.S. Cl.
CPC ............... *G01V 3/12* (2013.01); *G01S 5/02* (2013.01); *G01V 3/08* (2013.01); *G01V 3/15* (2013.01); *G08C 17/02* (2013.01)

(58) Field of Classification Search
CPC .......... G01R 31/023; G01V 3/12; G01V 3/15; G01V 3/08; G01V 3/165; G01V 3/38; G08C 17/02; G01S 5/02; G01S 19/00; H02G 9/00; G08B 5/22; G01K 1/00; G09B 23/28; G06F 15/173; G06T 15/40; H01L 2924/0002; H01L 2924/00; H01L 21/00; H01L 27/14618; H01L 27/14625; H01L 27/14627; H01L 27/14632; H01L 27/14685; H01L 27/14687

See application file for complete search history.

(56) References Cited

U.S. PATENT DOCUMENTS

| | | | | |
|---|---|---|---|---|
| 4,894,617 | A * | 1/1990 | Urbani .................... | G01V 3/15 |
| | | | | 324/239 |
| 2009/0089254 | A1* | 4/2009 | Von Kaenel ...... | G06F 17/30241 |
| 2010/0188245 | A1* | 7/2010 | Nielsen .................... | G01V 3/15 |
| | | | | 340/686.1 |

* cited by examiner

*Primary Examiner* — Dionne H Pendelton
(74) *Attorney, Agent, or Firm* — Mark Terry

(57) ABSTRACT

A system for generating a buffer zone around a buried asset at an above surface location is provided. The system includes an electromagnetic locator device for generating a plurality of buried asset data points via a plurality of radio frequency antennas. The system also includes a server for generating a plurality of connected line segments that represent a geographical position of the buried asset, wherein the plurality of connected line segments are generated by executing an optimization algorithm based on the plurality of buried asset data points, wherein the optimization algorithm: i) minimizes a total number of line segments, ii) minimizes a distance between a line segment and a corresponding buried asset data point, iii) minimizes instances of line segments that are parallel and iv) minimizes line segments shorter than a predefined threshold, and generates a first data structure that represents a two dimensional area comprising a buffer zone.

18 Claims, 12 Drawing Sheets

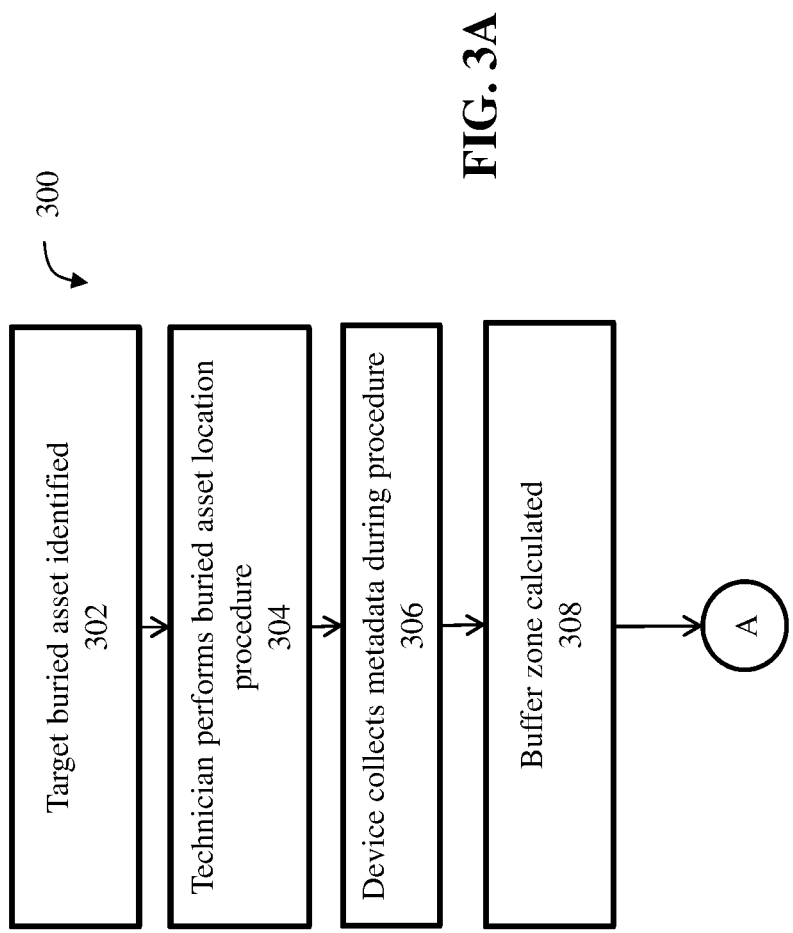

GENERATION OF BUFFER ZONES FOR BURIED ASSETS USING LINE FORMING PROCESSES

CROSS-REFERENCE TO RELATED APPLICATIONS

This patent application is a continuation in part of, and claims priority to, patent application Ser. No. 14/519,910 filed Oct. 21, 2014 and entitled "Improved Detection of Buried Assets Using Current Location and Known Buffer Zones," which is a continuation in part of, and claims priority to, patent application Ser. No. 14/226,397 filed Mar. 26, 2014 and entitled "Improved Detection of Buried Assets Using Current Location and Known Buffer Zones," which is a continuation in part of, and claims priority to, patent application Ser. No. 14/060,301 filed Oct. 22, 2013 and entitled "Detection of Incursion of Proposed Excavation Zones Into Buried Assets," which is a continuation in part of, and claims priority to, patent application Ser. No. 13/745,846 filed Jan. 20, 2013 and entitled "Storage and Recall of Buried Asset Data Over Communications Networks for Damage Avoidance and Mapping," which is a continuation in part of patent application Ser. No. 13/543,612 filed Jul. 6, 2012 and entitled "Storage and Recall of Buried Asset Data Over Communications Networks for Damage Avoidance and Mapping", now U.S. Pat. No. 8,358,201. The subject matter of patent application Ser. Nos. 14/519,910, 14/226,397, 14/060,301, 13/543,612 and 13/745,846 are hereby incorporated by reference in their entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The technical field relates generally to the detection and identification of buried assets (i.e., underground utility lines) and, more specifically, to processes for improving the generation of buffer zones around buried assets.

BACKGROUND

Utility lines, such as lines for telephones, electricity distribution, natural gas, cable television, fiber optics, Internet, traffic lights, street lights, storm drains, water mains, and wastewater pipes, are often located underground. Utility lines are referred to as "buried assets" herein. Consequently, before excavation occurs in an area, especially an urban area, an excavator is typically required to clear excavation activities with the proper authorities and service providers. The clearance procedure usually requires that the excavator contact a central authority (such as "One Call", "811" and "Call Before You Dig," which are well known in the art) which, in turn, sends a notification to the appropriate utility companies. Subsequently, each utility company must perform a buried asset detection procedure, which includes having a field technician visit the proposed excavation site, detecting the relevant buried assets and physically marking the position of the buried asset using temporary paint or flags. Usually, a technician visiting a proposed excavation site utilizes a device known as a conventional locator—a commercial, off-the-shelf, utility locator that detects and identifies buried assets using radio frequency and/or magnetic sensors. Upon completion of this procedure by the appropriate utility companies, excavation can occur with the security that buried assets will not be damaged During the excavation process, excavators must have accurate information regarding the location of buried assets, so as to avoid incursions into the buried assets with heavy equipment. When utility lines are inadvertently cut during excavation, the result can be disastrous and very costly. As such, in areas where space is at a minimum, such as dense urban areas, the accuracy of the position data of the buried assets becomes even more important. Excavators base their decisions regarding how and where to excavate, on the buried asset position data. Today, however, there is little data provided about buried assets, other than paint markers on the ground, or flags placed at various points along the route of the buried asset. Excavators make excavation decisions based on this scant data, which leaves much to be desired.

Furthermore, utility companies are faced with increasing requests to locate and mark the position of their buried assets to avoid damage from third party excavators, contractors and underground horizontal boring operations. When a utility company receives a notification from the central authority, the utility company must decide whether to: a) dispatch a field technician to physically locate and mark out the buried asset, or b) respond back to the central authority that the utility company is "not involved" and close the ticket, which normally occurs when the proposed excavation area is not within the proximity of a buried asset. Utility companies can lose considerable time and substantial capital by unnecessarily dispatching field technicians to perform locates and mark outs when the proposed excavation area is not within the proximity of a buried asset. These false dispatches can be due to inaccurate map records or unknown buried asset position relative to the proposed excavation or boring zone.

Therefore, a need exists for improvements over the prior art, and more particularly for more efficient methods and systems for logging the location of buried assets and for determining when a site visit by a field technician is required, with respect to a proposed excavation site.

SUMMARY

A method and system for generating a buffer zone around a buried asset at an above surface location is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a system for generating a buffer zone around a buried asset at an above surface location is provided that solves the above-described problems. The system includes an electromagnetic locator device communicatively coupled with a communications network, the locator device comprising a plurality of radio frequency antennas, and a processor configured for: (a) generating a plurality of buried asset data points via the plurality of radio frequency antennas, wherein each buried asset data point comprises a geographical coordinate for the buried asset, wherein the plurality of buried asset data points correspond to analog radio frequency signals that were detected and read from the buried asset at an above-surface location; and (b) transmitting the plurality of buried asset data points via the communications network. The system also includes a server communicatively coupled with the communications network, the processor including a memory and a processor configured for: (a) receiving from the electromagnetic locator device, via the communications network, the plurality of buried asset data points; (b) generating a plurality of connected line segments that represent a geographical position of the buried asset, wherein the plurality of connected line segments are generated by executing an optimization algorithm based on the plurality of buried asset data points, wherein the optimization algorithm: i) minimizes a total number of line segments, ii) minimizes a distance between a line segment and a corresponding buried asset data point, iii) minimizes instances of line segments that are parallel and iv) minimizes line segments shorter than a predefined threshold; and (c) generating a first data structure that represents a two dimensional area comprising a buffer zone at the above-surface location, wherein the first data structure is generated by: i) calculating a magnitude of error of the plurality of connected line segments based on distances between said plurality of connected line segments and corresponding buried asset data points of the plurality of buried asset data points, and ii) defining a two dimensional area around said plurality of connected line segments, wherein a size of said two dimensional area is proportional to the magnitude of error that was calculated.

BRIEF DESCRIPTION OF THE DRAWINGS

The accompanying drawings, which are incorporated in and constitute a part of this disclosure, illustrate various example embodiments. In the drawings:

FIG. 3A is a first portion of a flow chart showing the control flow of the process for generating a buffer zone around a buried asset at an above-surface location, according to an example embodiment;

DETAILED DESCRIPTION

Figure 1:
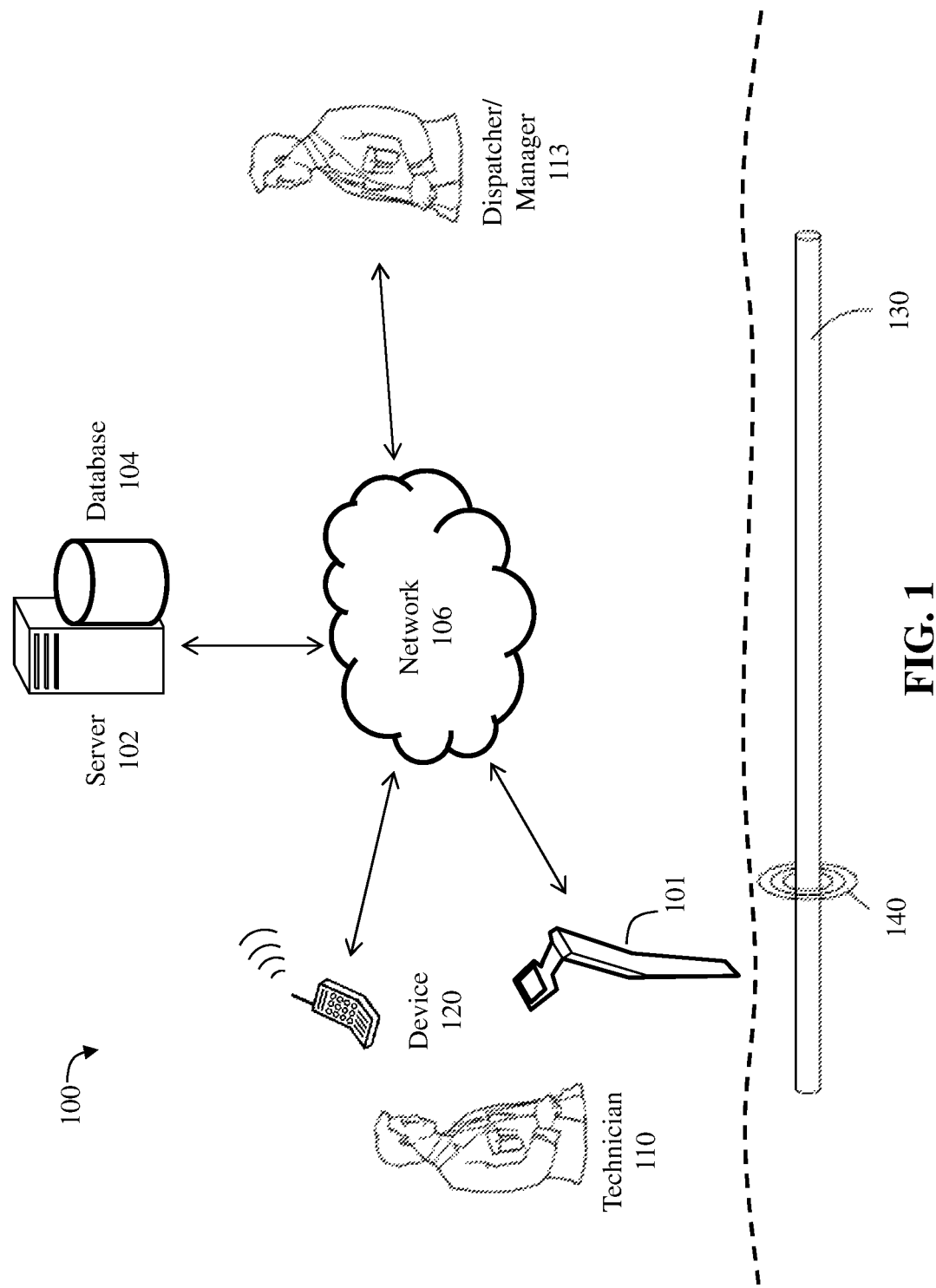
FIG. 1 is a diagram of an operating environment that supports a method and system for generating a buffer zone around a buried asset at an above surface location, according to an example embodiment.

The following detailed description refers to the accompanying drawings. Wherever possible, the same reference numbers are used in the drawings and the following description to refer to the same or similar elements. While embodiments may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The claimed subject matter improves over the prior art by providing a more accurate definition of a buffer zone around a buried asset, so as to provide better data for a field technician during a locate procedure and/or an excavator during excavation. The example embodiments automatically create a virtual two-dimensional or three-dimensional buffer zone around a buried asset, which is more accurate, since it takes into account the precision data value of buried asset data points, as well as line forming processes that are optimized. The buffer zones can thereby be used by a field technician during a locate procedure and/or an excavator during excavation. The example embodiments reduce or eliminate the number of disastrous and costly incursions into buried assets and increase the quality of excavation activities. This decreases operating costs associated with buried assets, for utility companies.

The claimed subject matter also improves over the prior art by providing a more efficient way of determining when a site visit by a field technician (i.e., a dispatch) is required, with respect to a proposed excavation site. The example embodiments automatically create a virtual two-dimensional or three-dimensional buffer zone around a buried asset, which can be compared to a proposed excavation zone to determine whether the two overlap, thereby necessitating a site visit by a field technician. The example embodiments reduce the number of false dispatches by enabling electronic analysis, evaluation and comparison of a proposed excavation zone with a buffer zone that has been created around a buried asset's location. A utility company, for example, may automatically and accurately filter incoming locate ticket requests, thus reducing unnecessary field technician dispatches. This decreases the costs associated with buried asset detection in relation to the central authority.

FIG. 1 is a diagram of an operating environment 100 that supports a method and system for generating a buffer zone around a buried asset at an above surface location. The server or computing device 102 may be communicatively coupled with a communications network 106, according to an example embodiment. The environment 100 may comprise mobile computing devices 120, 101, which may communicate with computing device 102 via a communications network 106. Mobile computing devices 120, 101 may comprise a cellular/mobile telephone, smart phone, tablet computer, laptop computer, handheld computer, wearable computer, locator device (see below), or the like. Devices 120, 101 may also comprise other computing devices such as desktop computers, workstations, servers, and game consoles, for example. The mobile computing devices 120, 101 may be connected either wirelessly or in a wired or fiber optic form to the communications network 106. Communications network 106 may be a packet switched network, such as the Internet, or any local area network, wide area network, enterprise private network, cellular network, phone network, mobile communications network, or any combination of the above.

FIG. 1 also shows a locator device 101, which detects and measures radio frequency and/or electromagnetic signals 140 emanating from a buried asset 130. In one embodiment, locator device 101 (otherwise known as an electromagnetic locator device (ELD) or simply a "locator") includes all of the functions of a conventional locator device, which is well known in the art. Locator 101 is also connected either wirelessly or in a wired or fiber optic form to the communications network 106. Locator 101 may comprise a computing device 600. In one embodiment, locator 101 may use the network connection of device 120 to connect to the network 106. In this embodiment, locator 101 may be communicatively coupled with the network connection of device 120. The ELD 101 may include one or more antenna, such as an antenna array, which detects radio frequency and/or magnetic signals 140 emanating from a buried asset 130.

The environment 100 shows that mobile computing device 120 is operated by a technician or operator 110 (i.e., a field technician). Server 102, locator 101 and device 120 may each comprise a computing device 600, described below in greater detail with respect to FIG. 6.

In another embodiment, the devices 120, 101 also calculate current geographical position (otherwise referred to as geographical location data) using an on-board processor or a connected processor. In one embodiment, the devices 120, 101 may calculate current position using a satellite or ground based positioning system, such as a Global Positioning System (GPS) system, which is a navigation device that receives satellite or land based signals for the purpose of determining the device's current geographical position on Earth. Generally, devices 120, 101 calculate global navigation satellite system (GNSS) data. A GNSS or GPS receiver, and its accompanying processor, may calculate latitude, longitude and altitude information. In this document, the terms GNSS and GPS are used generally to refer to any global navigation satellite system, such as GLONASS, GALILEO, GPS, etc. In this embodiment, a radio frequency signal is received from a satellite or ground based transmitter comprising a time the signal was transmitted and a position of the transmitter. Subsequently, the devices 120, 101 calculate current geographical location data of the device based on the signal. In another embodiment, the devices 120, 101 calculate current geographical location using alternative services, such as control plan locating, GSM localization, dead reckoning, or any combination of the aforementioned position services. The term spatial technologies or spatial processes refers generally to any processes and systems for determining one's position using radio signals received from various sources, including satellite sources, land-based sources and the like.

Computing device 102 includes a software engine that delivers applications, data, program code and other information to networked devices, such as 120, 101. The software engine of device 102 may perform other processes such as transferring multimedia data in a stream of packets that are interpreted and rendered by a software application as the packets arrive. FIG. 1 further shows that device 102 includes a database or repository 104, which may be a relational database comprising a Structured Query Language (SQL) database stored in a SQL server. Mobile computing devices 120, 101 may also include their own database, either locally or via the cloud. The database 104 may serve buried asset data, buffer zone data, portable transmitter hookup data, as well as related information, which may be used by device 102 and mobile computing devices 120, 101.

Device 102, mobile computing devices 120 and locator 101 may each include program logic comprising computer source code, scripting language code or interpreted language code that perform various functions of the disclosed embodiments. In one embodiment, the aforementioned program logic may comprise program module 607 in FIG. 6. It should be noted that although FIG. 1 shows only one mobile computing device 120, one locator 101 and one device 102, the system of the disclosed embodiments supports any number of servers, locators and mobile computing devices connected via network 106. Also note that although device 102 is shown as a single and independent entity, in one embodiment, device 102 and its functionality can be realized in a centralized fashion in one computer system or in a distributed fashion wherein different elements are spread across several interconnected computer systems.

Environment 100 may be used when devices 120, 101 engage in buried asset detection activities that comprise reading, generating, and storing buried asset data and related information. Various types of data may be stored in the database 104 of device 102 (as well as data storage on devices 120 and locator 101) with relation to a buried asset that has been detected and located. For example, the database 104 (or devices 120, and locator 101) may store one or more records for each buried asset, and each record may include one or more buried asset data points. A buried asset data point may include a current time, a textual map address, and location data or position data, such as latitude and longitude coordinates, geographical coordinates, an altitude coordinate, or the like. A buried asset data point may also include depth measurement data, electromagnetic signal measurement data (such as electrical current measurement data, resistance measurement data, impedance measurement data, electrical signal magnitude measurement data, electrical signal frequency measurement data, electrical signal voltage measurement data, etc.), direction data and orientation data. Each record may include data for one buried asset data point.

A buried asset data point may also include a precision data value corresponding to any piece of information associated with a buried asset data point, such as the geographical coordinate or. A precision data value is a value that represents the quality or level of precision of a piece of information, such as a geographical coordinate. All sensors and devices that read physical quantities have a certain amount of measurement error or observational error. A precision data value represents the amount or magnitude of the measurement error or observational error of a sensor or device at one time. In one embodiment, a precision data value is a numerical value, such as a real number from 0 to 1.0 (with a variable number of decimal points) wherein zero represents perfect precision, 0.5 represents a precision that is 50% off from a true value, 0.75 represents a precision that is 75% off from a true value, etc. In another embodiment, a precision data value is an alphanumeric value (such as a word or other ASCII string) that corresponds (according to a lookup table or other correspondence table) to a predefined amount of precision. In another embodiment, a precision data value is any set of values that may be sorted according to ascending or descending value. Thus, in this embodiment, precision data values may have ascending and descending values.

In one embodiment, the precision data value is inversely proportional to the level of precision of quality of a piece of information, such as a geographical coordinate. Thus, when there is a large margin of error or a low confidence level in a piece of information, then the precision data value is high and the quality or level of precision of the information is low. Conversely, when there is a small margin of error or a high confidence level in a piece of information, then the precision data value is low and the quality or level of precision of the information is high.

With regard to geographical coordinates, HDOP, VDOP, PDOP, and TDOP values (Horizontal, Vertical, Positional and Time Dilution of Precision, respectively) are precision data values well known in the art for representing the quality or level of precision of a geographical coordinate. Also with regard to geographical coordinates, values representing the quality or level of precision of a geographical coordinate may rely on whether a differential correction technique (such as differential GPS) was used in calculating the coordinate. The Differential Global Positioning System (DGPS) is an enhancement to Global Positioning System that provides improved location accuracy. DGPS uses a network of fixed, ground-based reference stations to broadcast the difference between the positions indicated by the satellite systems and the known fixed positions. As such, if DGPS was used to calculate a geographical coordinate, then the precision data value of the coordinate may reflect that fact. For example, the precision data value may indicate higher accuracy if DGPS was used.

In one embodiment, Precise Point Positioning (PPP) is used to generate a precision data value representing the quality or level of precision of a geographical coordinate. PPP is a global navigation satellite system positioning method to calculate precise positions up to few centimeter level using a single receiver in a dynamic and global reference framework. The PPP method combines precise clocks and orbits calculated from a global network to calculate a precise position with a single receiver.

A buried asset data point may also include a precision data value corresponding to any piece of information associated with a buried asset data point, such as a current time, a textual map address, depth measurement data, electrical signal measurement data (such as electrical current measurement data, signal strength data, resistance measurement data, impedance measurement data, electrical signal magnitude measurement data, electrical signal frequency measurement data, electrical signal voltage measurement data, electromagnetic vector data, horizontal EM field (peak), vertical EM field (null), etc.), direction data (left or right indicators that direct the technician to the location of the buried asset), orientation data, and location data or position data, such as latitude and longitude coordinates, geographical coordinates, an altitude coordinate, or the like.

Database 104 may also include a plurality of line segment records. A line segment record comprises a set of geographical points defining a straight line that represents a geographical position of the buried asset at the above-surface location, among other things. Note that in this description, any of the data described as stored in database 104 may also be stored in devices 120 and/or 101.

Figure 2:
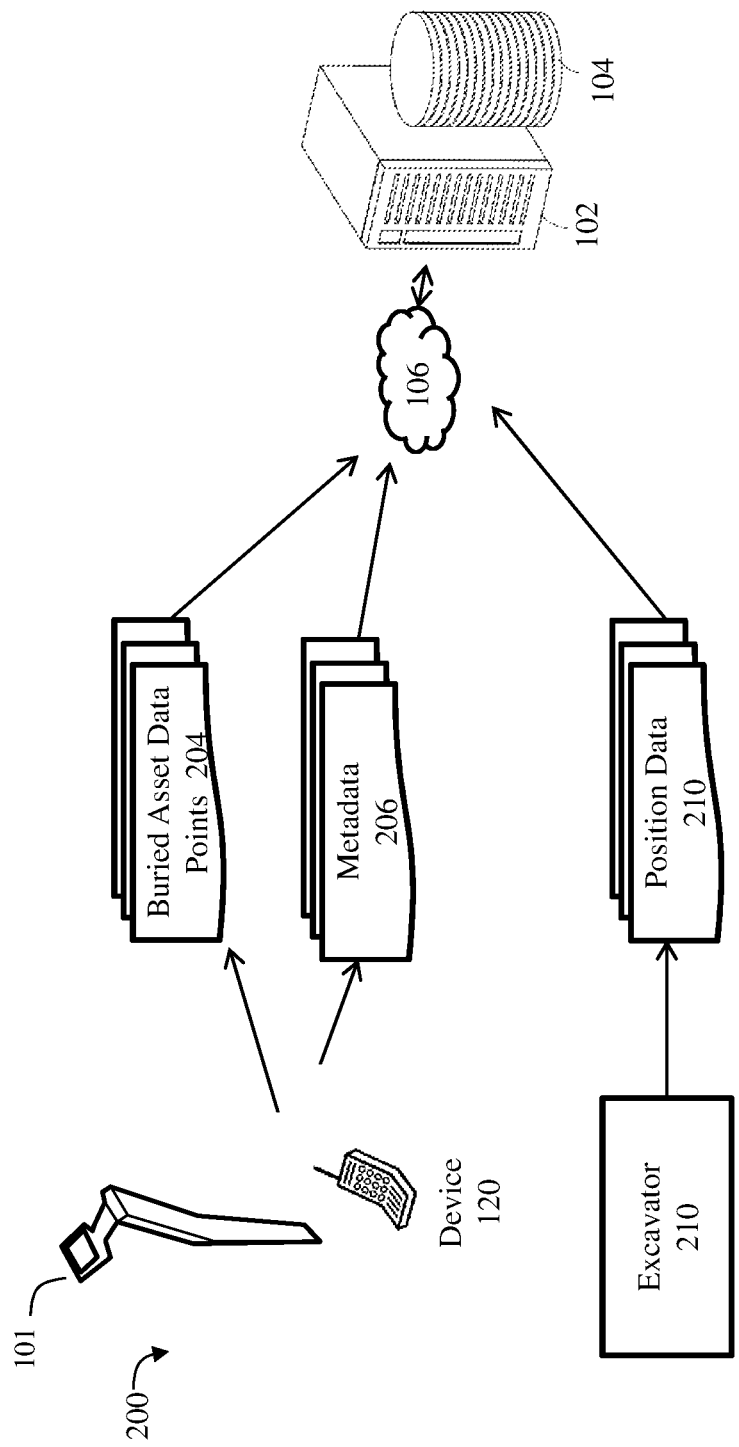
FIG. 2 is a diagram showing the data flow of the general process for generating a buffer zone around a buried asset at an above surface location, according to an example embodiment.
Figure 3B:
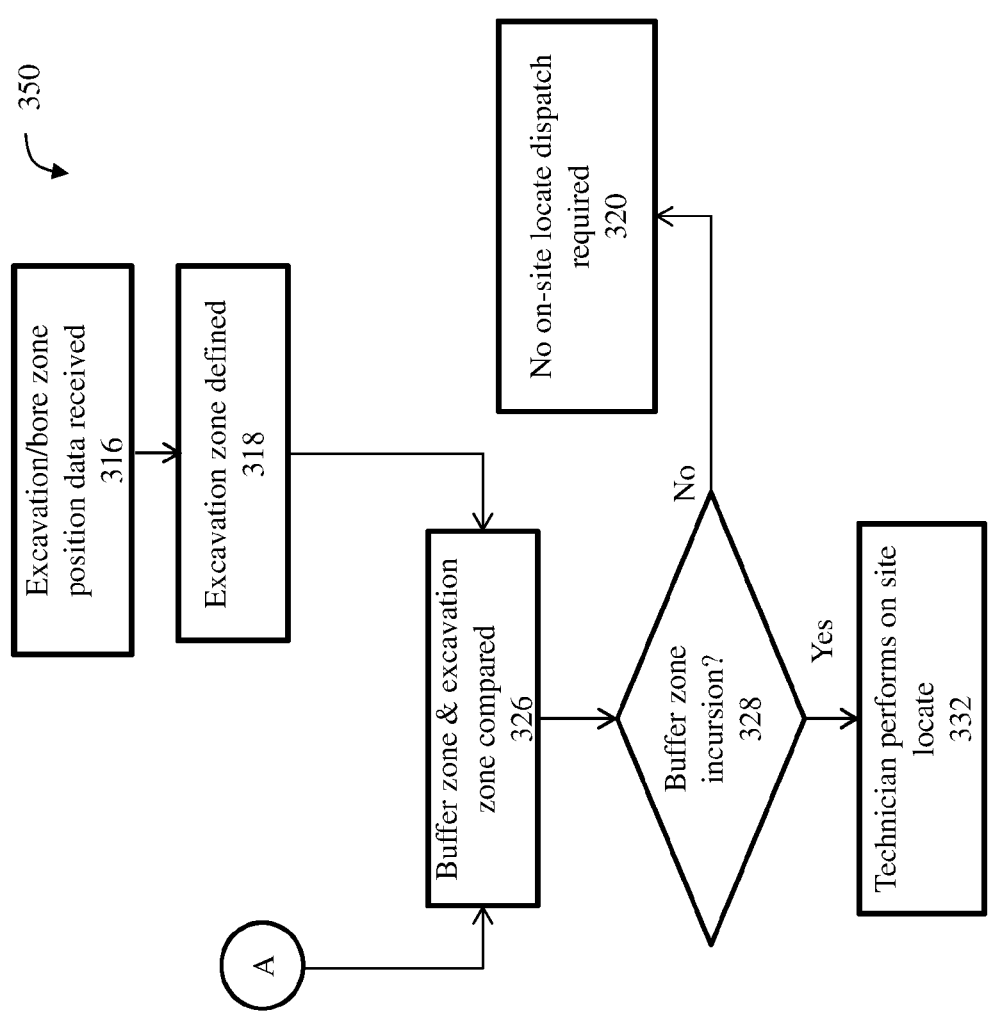
FIG. 3B is a second portion of a flow chart showing the control flow of the process for generating a buffer zone around a buried asset at an above-surface location, according to an example embodiment.

FIG. 3 is a flow chart showing the control flow of the process 300 for generating a buffer zone around a buried asset at an above surface location, according to an example embodiment. Process 300 describes the steps that begin to occur when the locate technician 110 detects and identifies a particular target buried asset 130 that may be located within an area including multiple buried assets. Process 300 describes the steps that occur when the server 102 automatically creates a virtual two-dimensional or three-dimensional buffer zone around a buried asset, which is later compared to a proposed excavation zone to determine whether the two overlap. The process 300 is described with reference to FIG. 2, which shows the general data flow 200 of the process 300.

Process 300 starts in earnest with step 302 wherein a target buried asset 130, which is the buried asset the technician 110 is seeking, is identified to the technician 110 and/or the server 102. In one embodiment, this step is accomplished when the device 102 receives a work ticket specifying that a buried asset locate procedure must be performed at a particular location for a particular buried asset identified by a unique identifier, type of buried asset, expected reading for buried asset, or the like. In another embodiment, this step is accomplished by the server 102 receiving a command from the technician 110, wherein the device 120 sends a unique identifier for the target buried asset 130 to the server 102 via network 106. Step 302 may be performed while the technician 110 is located on site in the vicinity of the target buried asset, while the technician is at work or headquarters, while the technician is at home, on the road, or at any other location. In another embodiment, step 302 may be performed automatically when the technician 110 arrives at the vicinity of the target buried asset, the device 120 sends its current geographical location to the device 102 and the device 102 determines which buried assets are located at said location. In yet another embodiment, step 302 may be performed automatically when a dispatcher or manager 113 sends a work ticket to the device of technician 110 via network 106.

In step 304, the technician 110 performs a buried asset location procedure using his locator 101/device 120 and generates buried asset data and/or buried asset data points 204, which may be stored locally on 101/120 and also uploaded to the server 102 via network 106. The device 101 may utilize an antenna array to read raw analog signals 140 emanating from the target buried asset 130. Based on the data it has received and calculated, device 101 calculates one or more buried asset data points 204 for the target buried asset. Upon generating the buried asset data points, the technician may place physical markings on the ground corresponding to each point, such as a flag, a paint mark or a combination of the two. The device 102 receives the buried asset data and/or buried asset data points 204 and creates records in the database 104 to hold said data.

In step 306, the locator 101/device 120 collects the following raw data produced by the locator 101/device 120 as a result of performance of the buried asset location procedure by the field technician 110: electromagnetic data 206 (also referred to as metadata) from one or more electromagnetic sensors in the locator 101/device 120, wherein said electromagnetic data includes current and depth measurements, as well as device gain and full scale deflection data, and wherein said electromagnetic data is produced as a result of movement of the locator 101/device 120 by the field technician during performance of the buried asset location procedure. Electromagnetic data 206 may be stored locally on 101/120 and also uploaded to the server 102 via network 106.

Electromagnetic data may include electrical current measurement data, resistance measurement data, impedance measurement data, electrical signal magnitude measurement data, electrical signal frequency measurement data, electrical signal voltage measurement data, etc. The electromagnetic data produced by the ELD may be displayed in the ELD, wherein motion data (leading up to the logging of the electromagnetic data) from the accelerometer and gyroscope in the ELD is stored, such that said motion data may be evaluated to determine proper performance and procedure of the buried asset location procedure leading up to the logging of the electromagnetic data.

Subsequently, in step 308, the server 102 proceeds to generate a buffer zone 480 or 502. Generally, the step 308 is performed by generating a plurality of connected line segments that represent a geographical position of the buried asset, wherein the plurality of connected line segments are generated by executing an optimization algorithm based on the plurality of buried asset data points, wherein the optimization algorithm: i) minimizes a total number of line segments, ii) minimizes a distance between a line segment and a corresponding buried asset data point, iii) minimizes instances of line segments that are parallel and iv) minimizes line segments shorter than a predefined threshold.

Subsequently, step 308 continues by generating a first data structure that represents a two dimensional area comprising a buffer zone 480 or 502 at the above-surface location, wherein the first data structure is generated by: i) calculating a magnitude of error of the plurality of connected line segments based on distances between said plurality of connected line segments and corresponding buried asset data points of the plurality of buried asset data points, and ii) defining a two dimensional area around said plurality of connected line segments, wherein a size of said two dimensional area is proportional to the magnitude of error that was calculated.

Figure 4A:
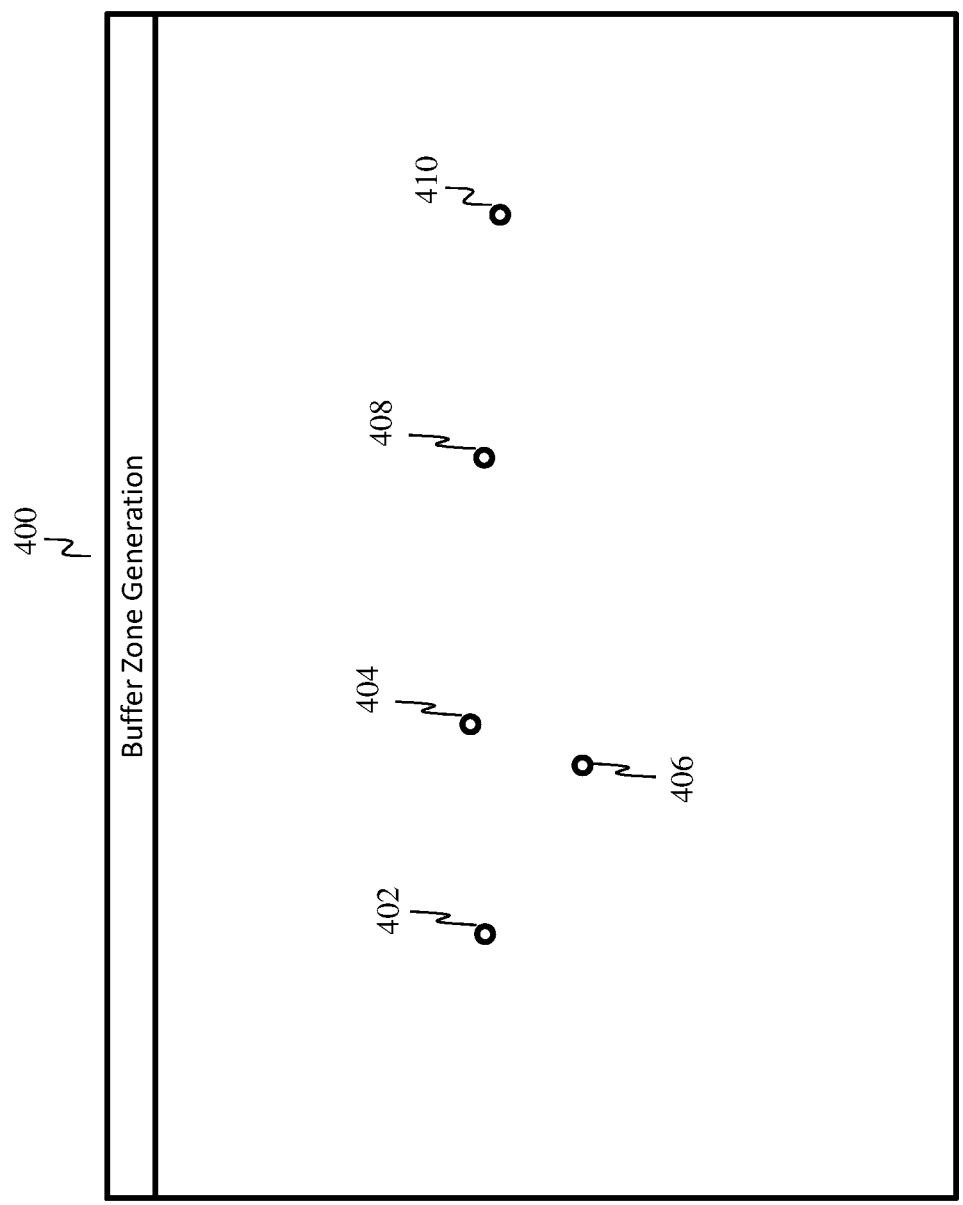
FIGS. 4A through 4E are illustrations of graphical user interfaces showing the process of logging buried asset data points and creating a polyline, as well as a buffer zone, based on said points, according to an example embodiment.

More specifically, the algorithm of step 308 may start by fitting a series of individual line segments to the set of buried asset data points 204 exhibiting Gaussian noise using a weighted least-squares minimization algorithm (which is well known in the art) that may be executed analytically and implemented using linear algebra routines, which are also well known in the art. FIG. 4A shows a set of buried asset data points 402 through 410.

Gaussian noise is statistical noise having a probability density function equal to that of the normal distribution of the sample data, which is also known as the Gaussian distribution. The values that the noise can take on are Gaussian-distributed. The method of least squares is a standard approach in regression analysis to the approximate solution of overdetermined systems. "Least squares" means that the overall solution minimizes the sum of the squares of the errors made in the results of every single equation. The error refers to the difference or distance between a buried asset data point and the line segment that is generated by the method. Herein, the application of least squares methodology is used in data fitting. The best fit in the least-squares sense minimizes the sum of squared residuals, a residual being the difference between an observed value (i.e., a buried asset data point) and the fitted value (i.e., the line segment) provided by the model. A special case of generalized least squares called weighted least squares occurs when all the off-diagonal entries of the correlation matrix of the residuals are null.

Figure 4B:
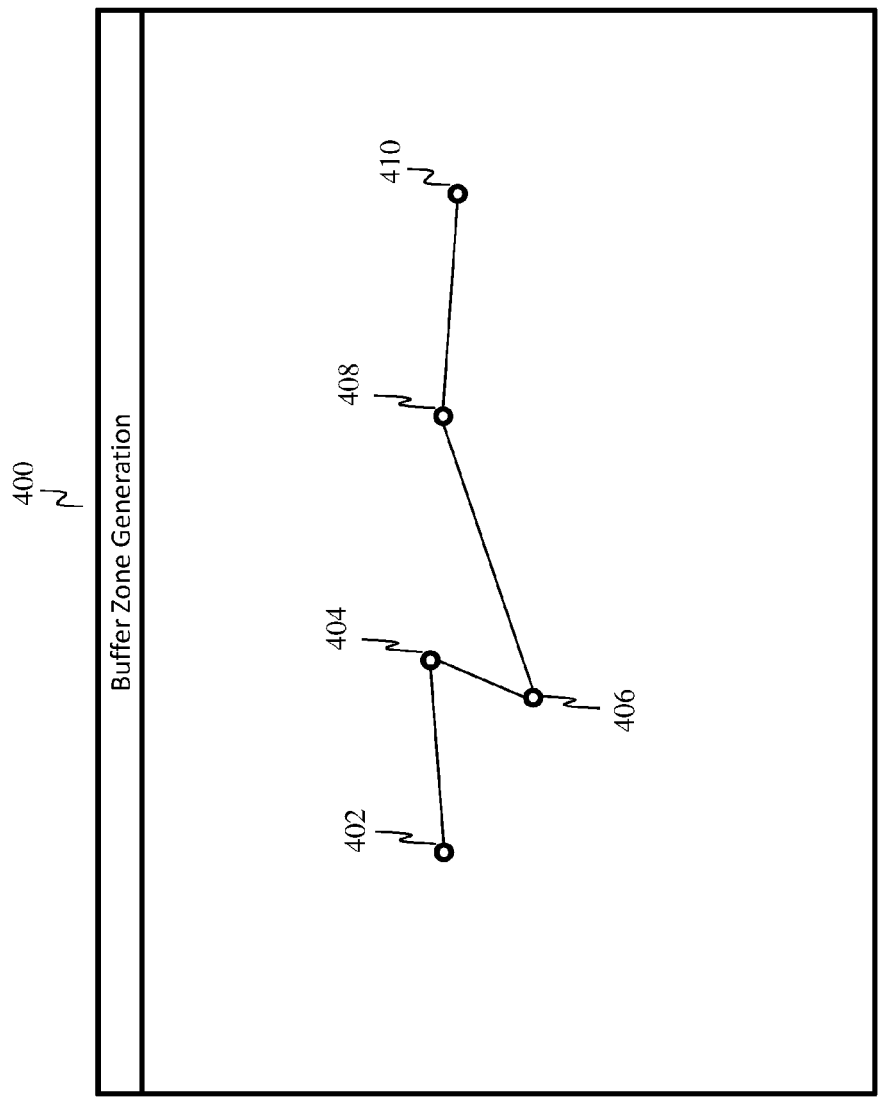

Each buried asset data point may be associated with a line segment to which the point is closest. As more line segments are added to the group of buried asset data points, the least-squared error decreases. With enough line segments, the algorithm could fit a line through all the buried asset data points and the total error would be zero. FIG. 4B shows a line segment connecting all of the buried asset data points 402 through 410 in the order in which the points were read by the technician. But the resulting line could zig-zag, backtrack and loop back and cross over itself, which would not be a good approximation of the location of the buried asset. This is because actual buried assets do not typically zig-zag, backtrack, loop back and cross over themselves, create sharp angles at junctions and create T-junctions. Actual buried assets are typically laid down in straight lines and may exhibit slight curves. FIG. 4B shows an example of said unwanted zig-zagging occurring in the line segments including points 402, 404, 406 and 408.

In order to minimize the occurrence of zig-zagging, backtracking, etc., the algorithm may include a cost function that attributes a cost to certain behavior, wherein the goal is to lower, or minimize, the cost as much as possible.

Figure 4C:
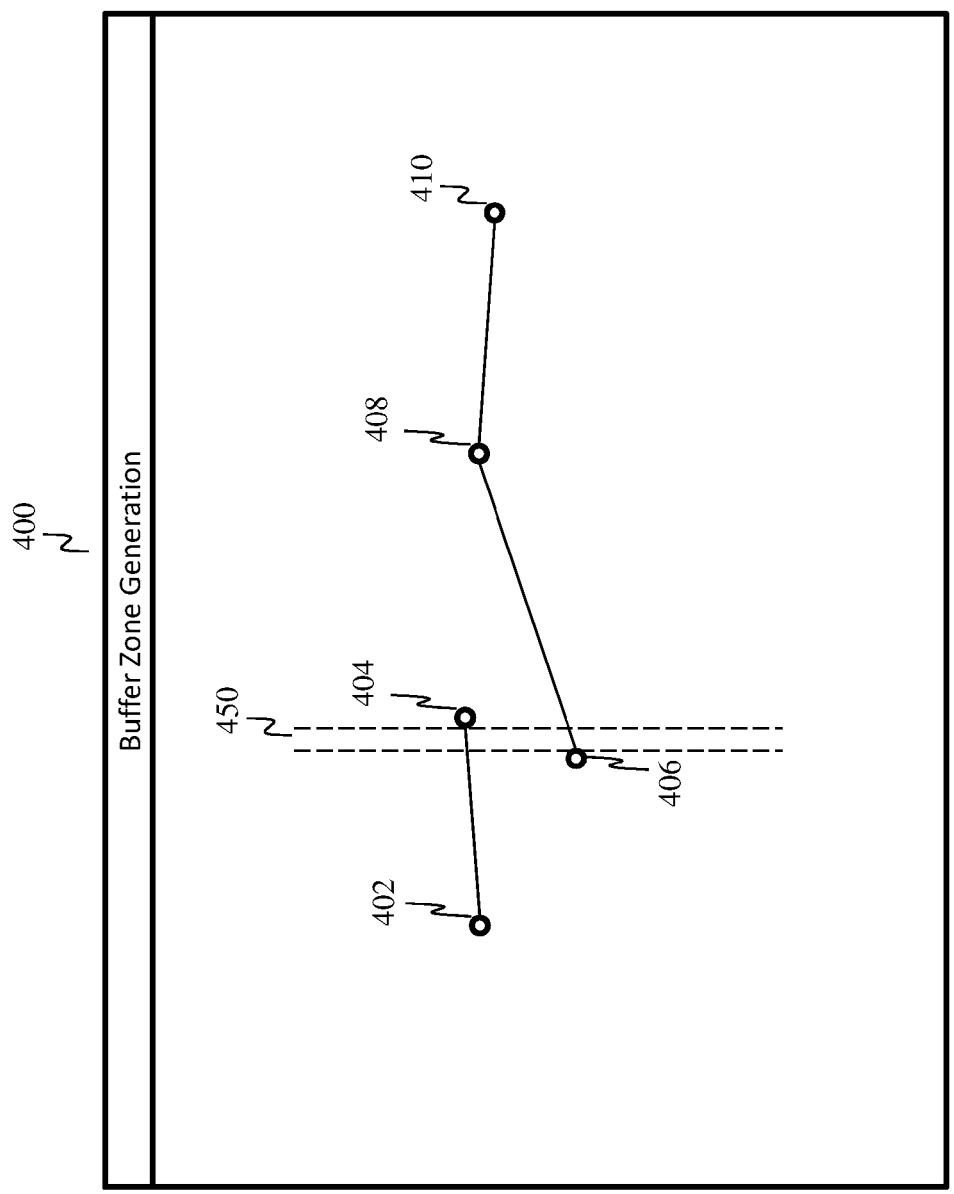

Consequently, the algorithm may include a cost function that: 1) penalizes excessive numbers of line segments, 2) does not overly penalize additional line segments, 3) penalizes line segments that have sections parallel to each other (see item 450 of FIG. 4C, for example), 4) penalizes line segments that involve sharp angles when they are joined together, 5) penalizes T-junction arrangements and similar unrealistic arrangements, and 6) penalizes very short line segments.

The cost function the algorithm uses may be based on an Akaike Information Criterion (AIC), a well-known metric for goodness of fit, with some additional penalty terms to penalize other unwanted outcomes. AIC is a measure of the relative quality of statistical models for a given set of data. Given a collection of models for the data, AIC estimates the quality of each model, relative to each of the other models.

Figure 4D:
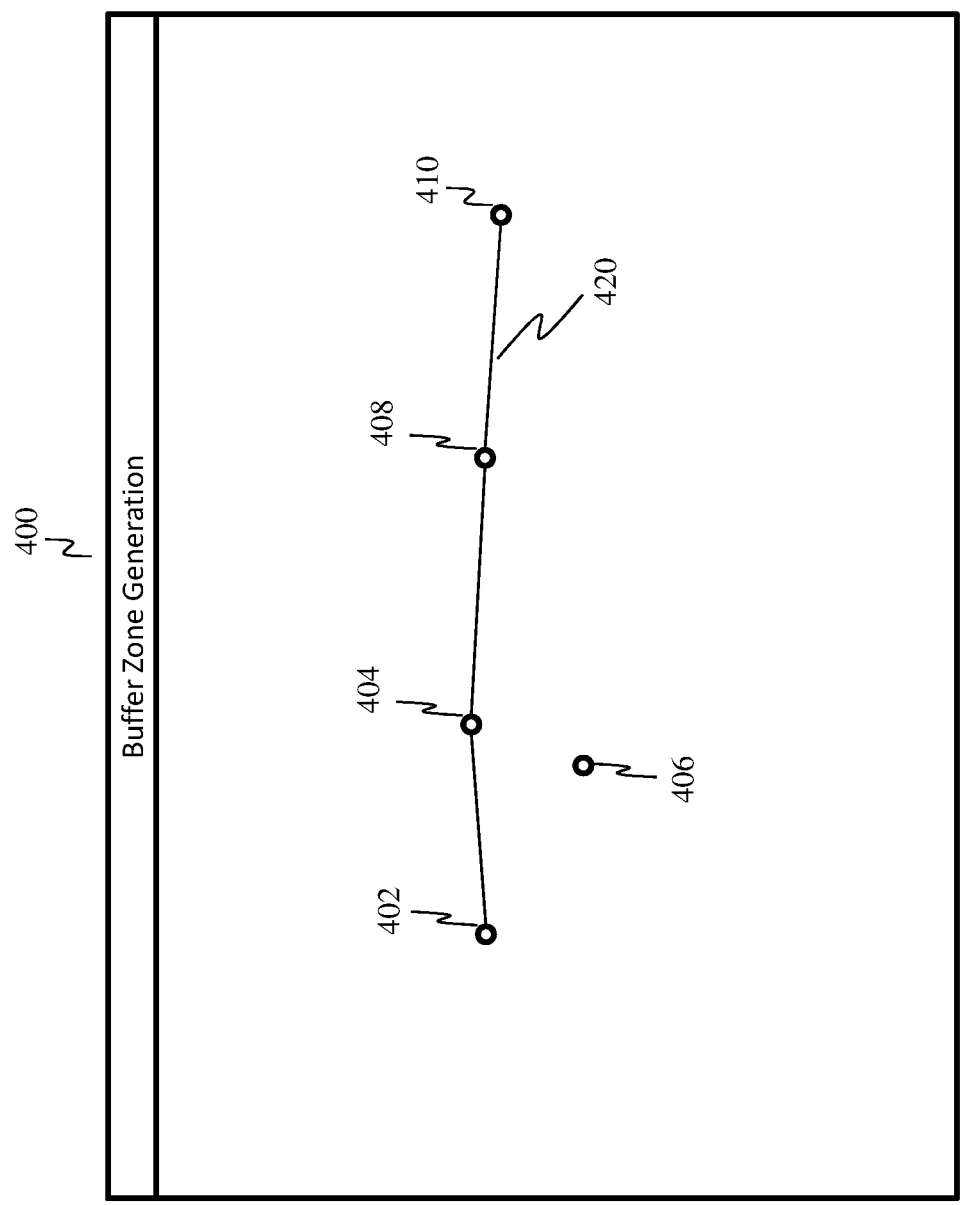
Figure 4E:
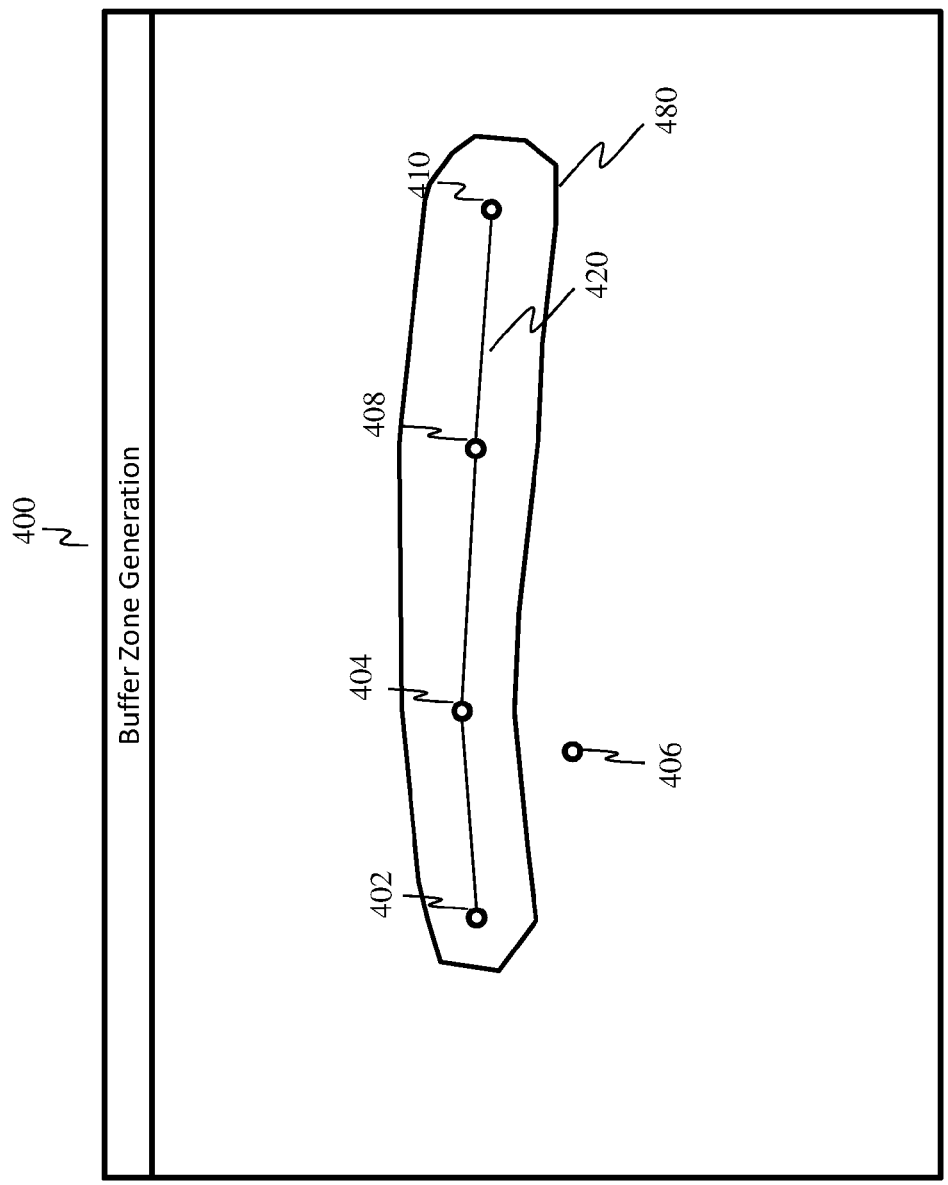

The algorithm may also then make an estimate of an error region around the line segments deemed to be the best fit. Using the error computation, outlier points may be flagged at this stage for later processing or removal. The algorithm may use an uncertainty calculation which gives an error metric which defines which points are not well-fit even by the nearest line segment. Those points can be flagged after line fitting and processed later. Point 406 in FIGS. 4A-4E is an example of a point that may be an outlier. FIG. 4D shows that the outlier 406 can be removed from processing.

In situations where there are two straight line segments which are separated by a large distance, but are well-aligned so that they fit a single line segment, this situation may arise due to road layouts on the ground. An underground cable may follow one road alignment, take a detour and then return to the original alignment again. To deal with this situation, the algorithm may add an additional restriction on line segment lengths. The algorithm may detects large jumps in distance between two line segments and allow said line segments to remain as two separate line segments, as opposed to one line segment.

At this point, a plurality of straight line segments which follow the buried asset have been produced. The algorithm proceeds to create from the plurality of line segments a single polyline 420, which is a combination of line segments that have been connected or merged. A polyline 420 is completely specified by a set of vertices in order, with the line segments running between the vertices. The next step merges the plurality of line segments to create a single polyline 420. Line segments are merged by either concatenating the vertices and/or adding a common intersection point between the line segments.

Finally, a boundary region or buffer zone 480 may be created around the resulting polyline 420. The width of the boundary region or buffer zone 480 may be computed based on the errors calculated at each endpoint of each line segment. If the calculated error is not wide enough to cover all the buried asset data points associated with a line segment, the boundary region or buffer zone 480 may be widened enough so that it covers all the buried asset data points associated with a line segment.

The size of the buffer zone 480 may also correspond to the precision data value corresponding to the geographical coordinate of each buried asset data point. In one embodiment, the buffer zone area generated around each buried asset data point or line segment is generated by creating a radius value that corresponds to the precision data value of the point (such as by multiplying the precision data value by a constant that represents the desired size of the buffer zone), and creating a two dimensional area around the buried asset data point or line segment using the radius value.

In one embodiment, the size of the buffer zone created around a buried asset data point or line segment is larger when the precision data value reflects low precision and the area is smaller when it reflects high precision. Thus, when the geographical coordinate of the buried asset data point has low precision (according to the precision data value), then the area is larger. When the geographical coordinate of the buried asset data point has high precision (according to the precision data value), then the area is smaller Parallel to steps 302 through 308, in step 316, an excavator 210 or other entity sends to server 102 the position data 210 for a proposed excavation zone. The position data may take a variety of forms, including a set of geographical coordinates, a definition of a two-dimensional surface, a definition of a three-dimensional solid, any set of position data that defines a two or three-dimensional area, etc. In step 318, the server 102 automatically creates a two-dimensional or three-dimensional excavation zone 504, as defined more fully below.

In step 326, the buffer zone 502 generated by the server 102 and the excavation zone 504 generated by the server 102 are compared to determine whether there is an incursion of the excavation zone into the buffer zone (see FIGS. 5A-5B below). In one embodiment, collision detection techniques known in the art may be used to determine whether the two or three dimensional buffer zone intersects with the two or three dimensional excavation zone. The result of the outcome of step 326 is stored in memory of server 102 and/or in the database 104 as a data element that indicates whether the two or three dimensional buffer zone intersects with the two or three dimensional excavation zone. In step 328, if there is an incursion, then control flows to step 332. If there is no incursion, then control flows to step 320. In step 320, since there is no incursion, there is no need for a locate technician to be dispatched to the excavation site and the ticket is closed. The outcome shown in step 320 illustrates an instance wherein a locate technician was not dispatched because it was not deemed necessary by step 328, thereby increasing efficiency.

In step 332, an incursion of the excavation zone into a buried asset has been detected, and therefore the server 102 transmits a locate request to the device 120/101 of technician 110. The locate request may define the excavation zone and the buffer zone generated by the server 102 and may include a request to perform a locate procedure. In step 332, the technician 110 may travel to the proposed excavation site and perform a locate procedure at the proposed excavation site, which includes marking out the location of the buried asset on the ground using, for example, temporary spray paint. Subsequently, the work ticket is closed. The outcome of flowcharts 300-350 showcase how dispatches only occur when the chance of an excavation zone incursion into a buried asset is too high, as calculated by step 328, thereby reducing the number of false dispatches.

Figure 5A:
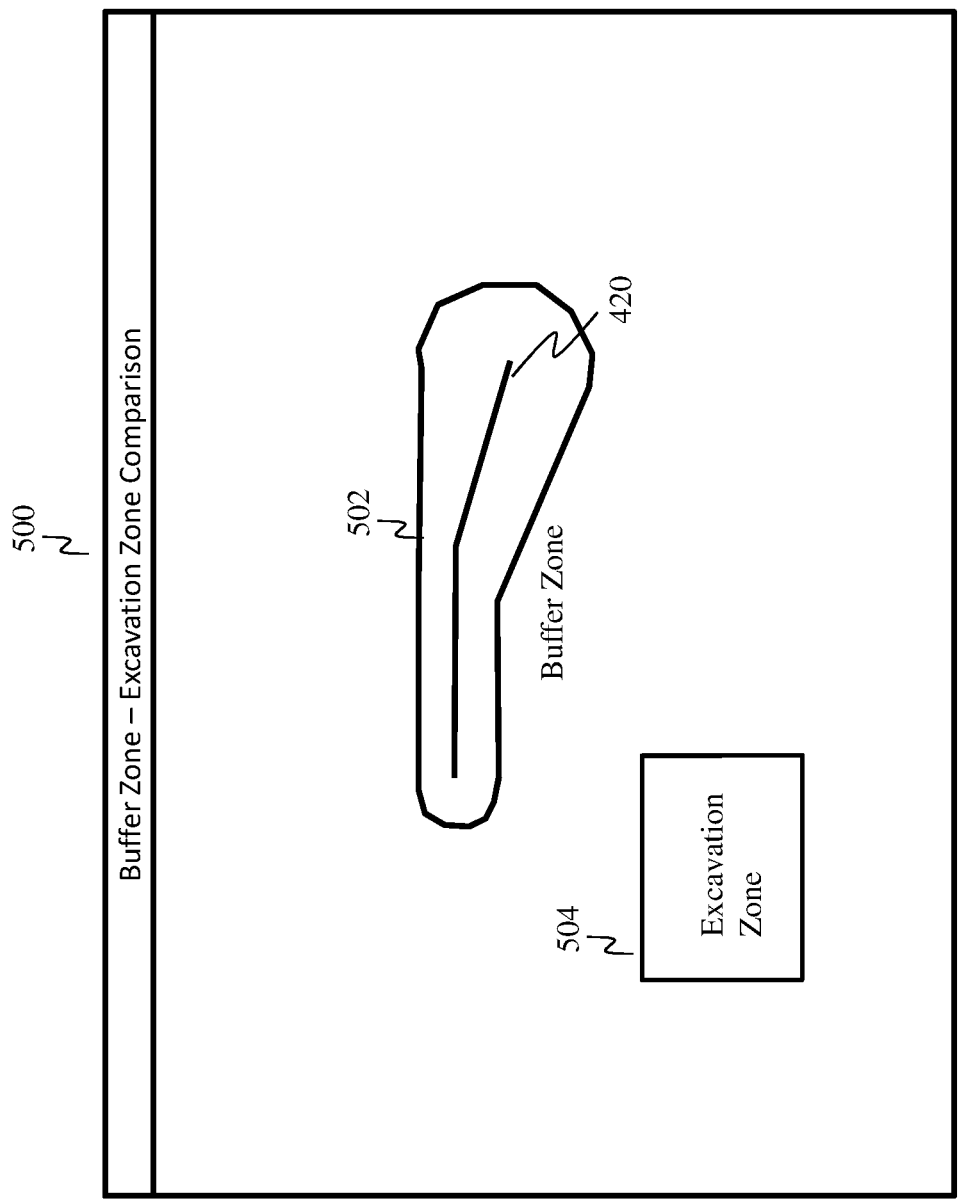
FIG. 5A is an illustration of a graphical user interface that shows a process for detecting incursions into a buffer zone, according to an example embodiment.

FIG. 5A is an illustration of a GUI 500 that shows a two-dimensional buffer zone 502 defined around buried asset data points and a two-dimensional proposed excavation zone 504, according to an example embodiment. The GUI 500 shows that buffer zone 502 does not intersect with excavation zone 504, and therefore there is no need for a technician 110 to be dispatched to perform a locate procedure at the location of excavation zone 504.

Figure 5B:
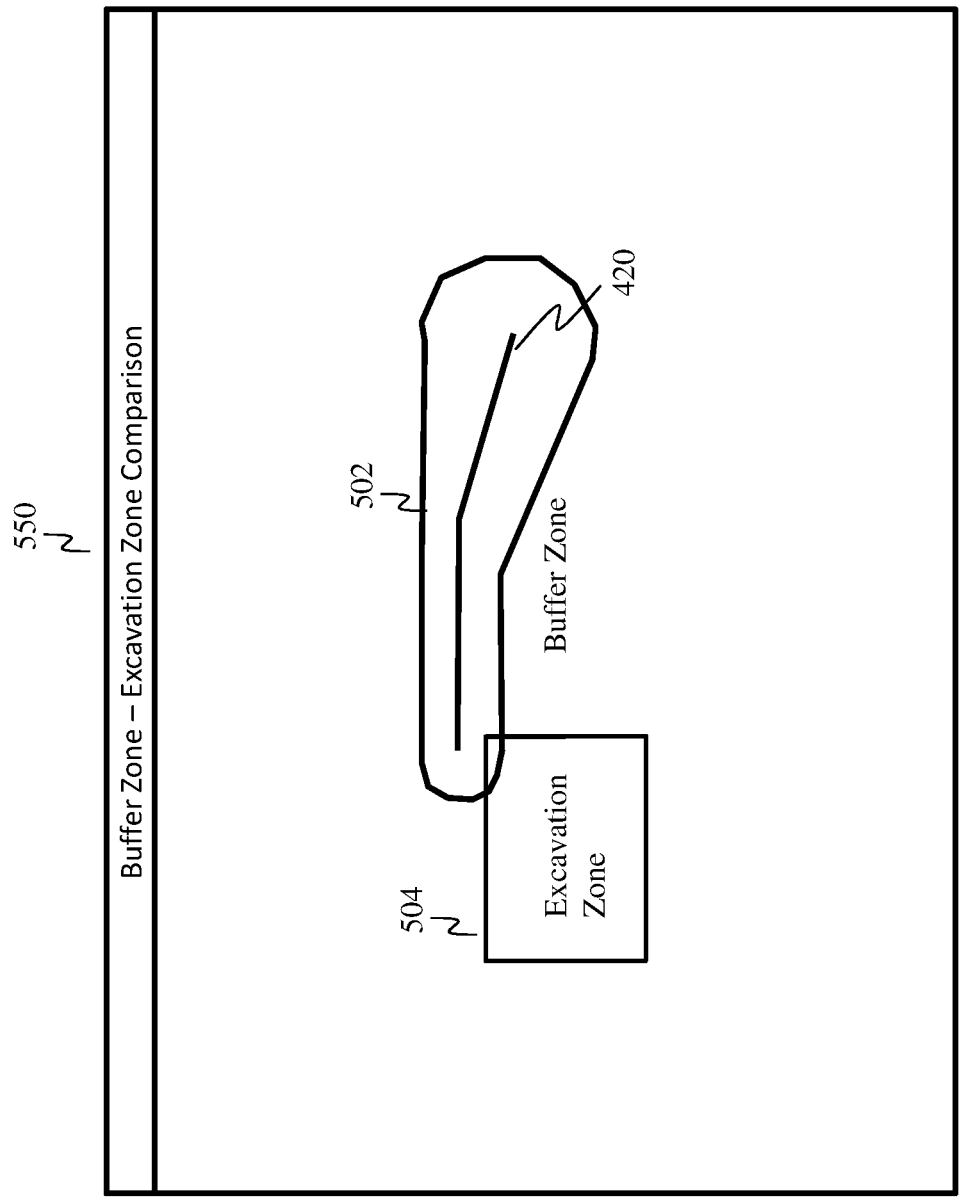
FIG. 5B is an illustration of another graphical user interface that shows a process for detecting incursions into a buffer zone, according to an example embodiment.

FIG. 5B is an illustration of another GUI 550 that shows a two-dimensional buffer zone 502 defined around buried asset data points and a two-dimensional proposed excavation zone 504, according to an example embodiment. The GUI 550 shows that buffer zone 502 intersects with excavation zone 504, and therefore there is a need for a technician 110 to be dispatched to perform a locate procedure at the location of excavation zone 504.

Figure 6:
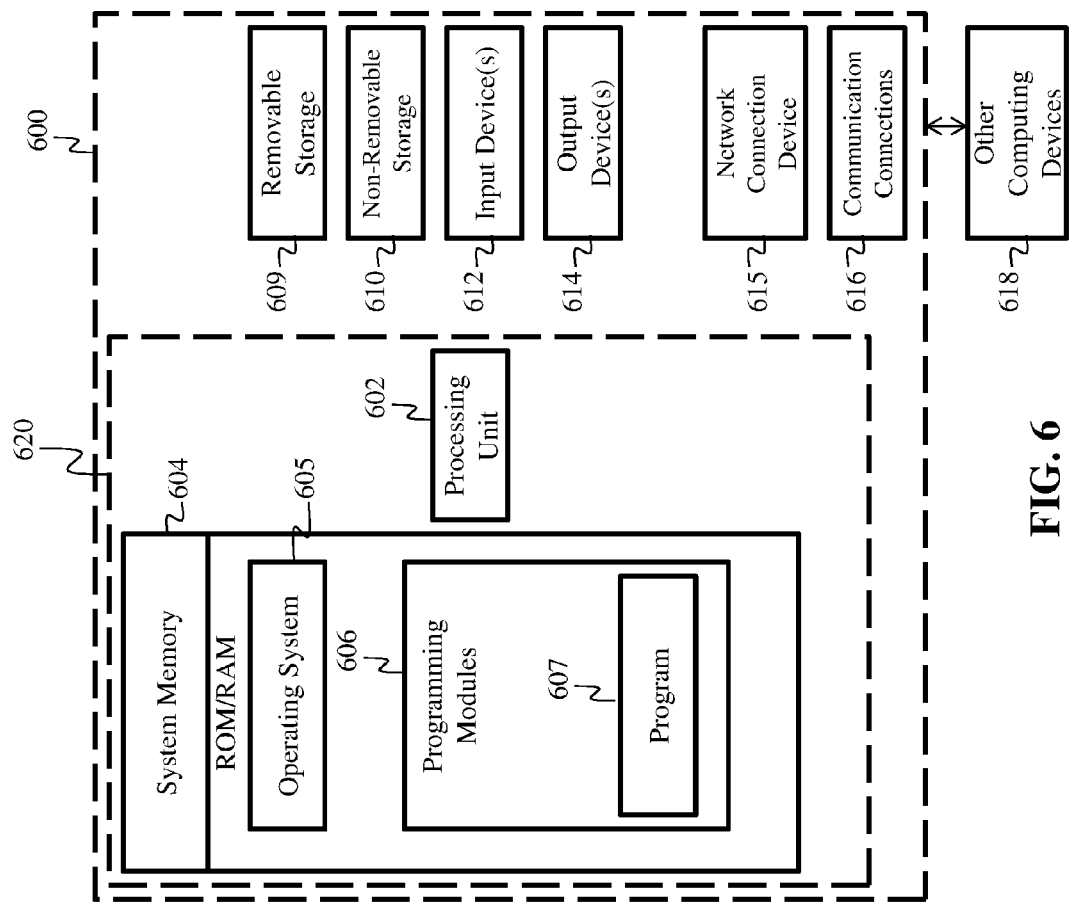
FIG. 6 is a block diagram of a system including a computing device, according to an example embodiment.

FIG. 6 is a block diagram of a system including an example computing device 600 and other computing devices. Consistent with the embodiments described herein, the aforementioned actions performed by device 102, devices 120 and locator 101 may be implemented in a computing device, such as the computing device 600 of FIG. 6. Any suitable combination of hardware, software, or firmware may be used to implement the computing device 600. The aforementioned system, device, and processors are examples and other systems, devices, and processors may comprise the aforementioned computing device. Furthermore, computing device 600 may comprise an operating environment for system 100 and process 300, as described above. Process 300, 350 may operate in other environments and are not limited to computing device 600.

The claimed embodiments provide a technical solution to the technical problem encountered by excavators or locate technicians who may have access to buried asset data points but who cannot discern an above-ground area that corresponds to a buried asset. The technical problem is brought on by the vast amount of data that is collected by an ELD at the time a locate procedure is executed, and by the vast amount of data that is generated by a remote server after a locate procedure is executed. A locate procedure may collect, for example, buried asset data points that contain a myriad of information, as explained more fully above. Subsequent to a locate procedure, additional data may be generated about the buried asset data points, such as precision data values, for example. All of the above data can be difficult to wade through for excavators or locate technicians seeking simply to locate an above-ground area that corresponds to a buried asset. The claimed embodiments provide a technical solution to said problem by utilizing statistical and mathematical techniques to process the plethora of data collected during a locate procedure and generated afterwards, so as to generate a buffer zone that easily conveys to excavators or locate technicians an above-ground area that corresponds to a buried asset.

With reference to FIG. 6, a system consistent with an embodiment may include a plurality of computing devices, such as computing device 600. In a basic configuration, computing device 600 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, or any combination or memory. System memory 604 may include operating system 605, and one or more programming modules 606. Operating system 605, for example, may be suitable for controlling computing device 600's operation. In one embodiment, programming modules 606 may include, for example, a program module 607 for executing the actions of device 102, devices 120 and locator 101. Furthermore, embodiments may be practiced in conjunction with a graphics library, other operating systems, or any other application program and is not limited to any particular application or system.

This basic configuration is illustrated in FIG. 6 by those components within a dashed line 620.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a camera, a touch input device, etc. Output device(s) 614 such as a display, speakers, a printer, etc. may also be included. Computing device 600 may also include a vibration device capable of initiating a vibration in the device on command, such as a mechanical vibrator or a vibrating alert motor. The aforementioned devices are only examples, and other devices may be added or substituted.

Computing device 600 may also contain a network connection device 615 that may allow device 600 to communicate with other computing devices 618, such as over a network in a distributed computing environment, for example, an intranet or the Internet. Device 615 may be a wired or wireless network interface controller, a network interface card, a network interface device, a network adapter or a LAN adapter. Device 615 allows for a communication connection 616 for communicating with other computing devices 618. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 604, including operating system 605. While executing on processing unit 602, programming modules 606 (e.g. program module 607) may perform processes including, for example, one or more of the stages of the processes 300, 350 as described above. The aforementioned processes are examples, and processing unit 602 may perform other processes. Other programming modules that may be used in accordance with embodiments herein may include electronic mail and contacts applications, word processing applications, spreadsheet applications, database applications, slide presentation applications, drawing or computer-aided application programs, etc.

Generally, consistent with embodiments herein, program modules may include routines, programs, components, data structures, and other types of structures that may perform particular tasks or that may implement particular abstract data types. Moreover, embodiments herein may be practiced with other computer system configurations, including handheld devices, multiprocessor systems, microprocessor-based or programmable consumer electronics, minicomputers, mainframe computers, and the like. Embodiments herein may also be practiced in distributed computing environments where tasks are performed by remote processing devices that are linked through a communications network. In a distributed computing environment, program modules may be located in both local and remote memory storage devices.

Furthermore, embodiments herein may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments herein may also be practiced using other technologies capable of performing logical operations such as, for example, AND, OR, and NOT, including but not limited to mechanical, optical, fluidic, and quantum technologies. In addition, embodiments herein may be practiced within a general purpose computer or in any other circuits or systems.

Embodiments herein, for example, are described above with reference to block diagrams and/or operational illustrations of methods, systems, and computer program products according to said embodiments. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments herein have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for generating a buffer zone around a buried asset at an above surface location, the system comprising:
   an electromagnetic locator device communicatively coupled with a communications network, the locator device comprising a plurality of radio frequency antennas, and being configured for:
   (a) generating a plurality of buried asset data points via the plurality of radio frequency antennas, wherein each buried asset data point comprises a geographical coordinate for the buried asset, wherein the plurality of buried asset data points correspond to analog radio frequency signals that were detected and read from the buried asset at an above-surface location; and (b) transmitting the plurality of buried asset data points via the communications network;

a server communicatively coupled with the communications network, a processor including a memory and wherein the processor configured for:

(a) receiving from the electromagnetic locator device, via the communications network, the plurality of buried asset data points;

(b) generating a plurality of connected line segments that represent a geographical position of the buried asset, wherein the plurality of connected line segments are generated by executing an optimization algorithm based on the plurality of buried asset data points, wherein the optimization algorithm: i) minimizes a total number of line segments, ii) minimizes a distance between a line segment and a corresponding buried asset data point, iii) minimizes instances of line segments that are parallel and iv) minimizes line segments shorter than a predefined threshold; and (c) generating a first data structure that represents a two dimensional area comprising a buffer zone at the above-surface location, wherein the first data structure is generated by: i) calculating a magnitude of error of the plurality of connected line segments based on distances between said plurality of connected line segments and corresponding buried asset data points of the plurality of buried asset data points, and ii) defining a two dimensional area around said plurality of connected line segments, wherein a size of said two dimensional area is proportional to the magnitude of error that was calculated.

2. The system of claim 1, wherein the processor of the server is further configured for storing said plurality of connected line segments and said first data structure in association with the plurality of buried asset data points.

3. The system of claim 2, wherein the processor of the server is further configured for transmitting said plurality of connected line segments, said first data structure and said plurality of buried asset data points to another computing device via the communications network.

4. The system of claim 2, wherein the processor of the server is further configured for transmitting said plurality of connected line segments, said first data structure and said plurality of buried asset data points to the electromagnetic locator device via the communications network.

5. The system of claim 1, wherein each line segment comprises a set of points defining a straight line that represents a geographical position of the buried asset at the above-surface location.

6. The system of claim 5, wherein the step of calculating the magnitude of error of the plurality of connected line segments further comprises:

calculating the magnitude of error of the plurality of connected line segments by calculating a distance between each line segment of said plurality of connected line segments and a corresponding buried asset data point of the plurality of buried asset data points, so as to generate a plurality of distance values, and by calculating the magnitude of error to be proportional to said plurality of distance values.

7. A system for generating a buffer zone around a buried asset at an above surface location, the system comprising:

an electromagnetic locator device communicatively coupled with a communications network, the locator device comprising a plurality of radio frequency antennas, and being configured for:

(a) generating a plurality of buried asset data points via the plurality of radio frequency antennas, wherein each buried asset data point comprises a geographical coordinate for the buried asset, wherein the plurality of buried asset data points correspond to analog radio frequency signals that were detected and read from the buried asset at an above-surface location; and (b) transmitting the plurality of buried asset data points via the communications network;

a database communicatively coupled with the communications network;

a server communicatively coupled with the communications network, a processor including a memory and wherein the processor configured for:

(a) receiving the plurality of buried asset data points from the electromagnetic locator device, via the communications network;

(b) storing the plurality of buried asset data points in the database;

(c) generating a plurality of connected line segments that represent a geographical position of the buried asset, wherein the plurality of connected line segments are generated by executing an optimization algorithm based on the plurality of buried asset data points, wherein the optimization algorithm: i) minimizes a total number of line segments, ii) minimizes a distance between a line segment and a corresponding buried asset data point, iii) minimizes instances of line segments that are parallel and iv) minimizes line segments shorter than a predefined threshold; and (d) generating a first data structure that represents a two dimensional area comprising a buffer zone at the above-surface location, wherein the first data structure is generated by: i) calculating a magnitude of error of the plurality of connected line segments based on distances between said plurality of connected line segments and corresponding buried asset data points of the plurality of buried asset data points, and ii) defining a two dimensional area around said plurality of connected line segments, wherein a size of said two dimensional area is proportional to the magnitude of error that was calculated.

8. The system of claim 7, wherein the processor of the server is further configured for storing said plurality of connected line segments and said first data structure in association with the plurality of buried asset data points in the database.

9. The system of claim 8, wherein the processor of the server is further configured for transmitting said plurality of connected line segments, said first data structure and said plurality of buried asset data points to another computing device via the communications network.

10. The system of claim 8, wherein the processor of the server is further configured for transmitting said plurality of connected line segments, said first data structure and said plurality of buried asset data points to the electromagnetic locator device via the communications network.

11. The system of claim 10, wherein the step of generating the plurality of connected line segments further comprises:

generating the plurality of connected line segments, wherein each line segment comprises a set of points defining a straight line that represents a geographical position of the buried asset at the above-surface location.

12. The system of claim 11, wherein the step of calculating a magnitude of error of the plurality of connected line segments further comprises:

calculating a magnitude of error of the plurality of connected line segments by calculating a distance between each line segment of said plurality of connected line segments and a corresponding buried asset data point of the plurality of buried asset data points, so as to generate a plurality of distance values, and by calculating the magnitude of error to be proportional to said plurality of distance values.

13. A system for generating a buffer zone around a buried asset at an above surface location, the system comprising:

an electromagnetic locator device communicatively coupled with a communications network, the locator device comprising a plurality of radio frequency antennas, and being configured for:
 (a) generating a plurality of buried asset data points via the plurality of radio frequency antennas, wherein each buried asset data point comprises a geographical coordinate for the buried asset, wherein the plurality of buried asset data points correspond to analog radio frequency signals that were detected and read from the buried asset at an above-surface location; and
 (b) transmitting the plurality of buried asset data points via the communications network;

a database communicatively coupled with the communications network, the database for storing the plurality of buried asset data points;

a server communicatively coupled with a communications network, a processor including a memory and wherein the processor configured for:
 (a) generating a plurality of connected line segments that represent a geographical position of the buried asset, wherein the plurality of connected line segments are generated by executing an optimization algorithm based on the plurality of buried asset data points, wherein the optimization algorithm: i) minimizes a total number of line segments, ii) minimizes a distance between a line segment and a corresponding buried asset data point, iii) minimizes instances of line segments that are parallel and iv) minimizes line segments shorter than a predefined threshold; and (b) generating a first data structure that represents a two dimensional area comprising a buffer zone at the above-surface location, wherein the first data structure is generated by: i) calculating a magnitude of error of the plurality of connected line segments based on distances between said plurality of connected line segments and corresponding buried asset data points of the plurality of buried asset data points, and ii) defining a two dimensional area around said plurality of connected line segments, wherein a size of said two dimensional area is proportional to the magnitude of error that was calculated.

14. The system of claim 13, wherein the processor of the server is further configured for:

storing said plurality of connected line segments and said first data structure in association with the plurality of buried asset data points in the database.

15. The system of claim 14, wherein the processor of the server is further configured for:

transmitting said plurality of connected line segments, said first data structure and said plurality of buried asset data points to another computing device via the communications network.

16. The system of claim 14, wherein the processor of the server is further configured for:

transmitting said plurality of connected line segments, said first data structure and said plurality of buried asset data points to the electromagnetic locator device via the communications network.

17. The system of claim 16, wherein the step of generating the plurality of connected line segments further comprises:

generating the plurality of connected line segments, wherein each line segment comprises a set of points defining a straight line that represents a geographical position of the buried asset at the above-surface location.

18. The system of claim 17, wherein the step of calculating the magnitude of error of the plurality of connected line segments further comprises:

calculating the magnitude of error of the plurality of connected line segments by calculating a distance between each line segment of said plurality of connected line segments and a corresponding buried asset data point of the plurality of buried asset data points, so as to generate a plurality of distance values, and by calculating the magnitude of error to be proportional to said plurality of distance values.

* * * * *